F. L. McGAHAN.
HIGH PRESSURE PIPE HINGE.
APPLICATION FILED NOV. 3, 1911.
1,056,762.
Patented Mar. 18, 1913.
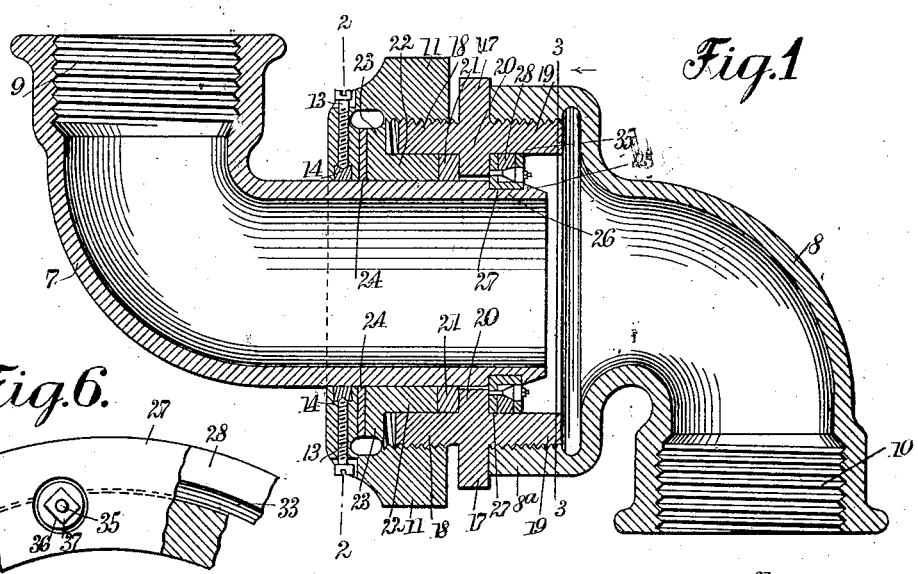
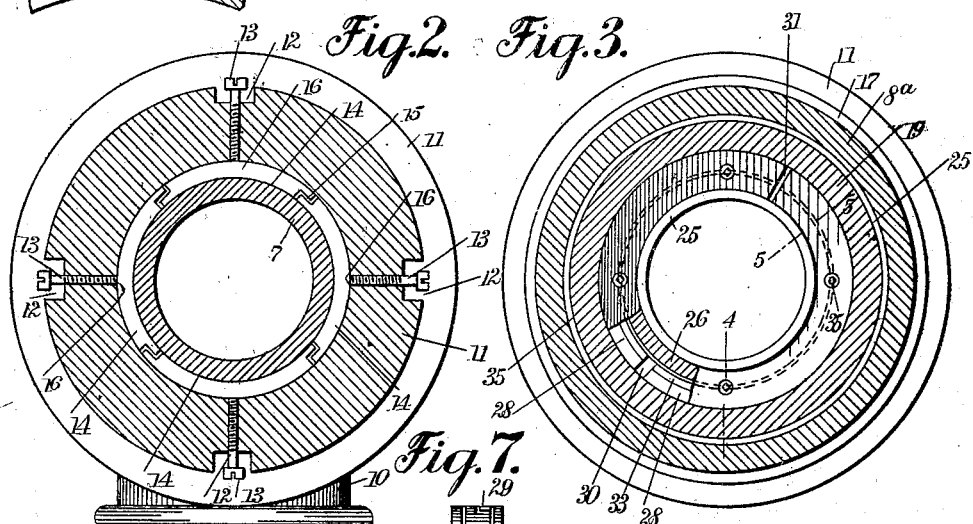
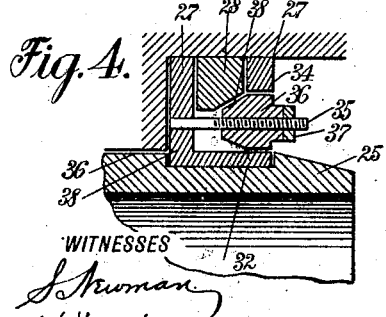
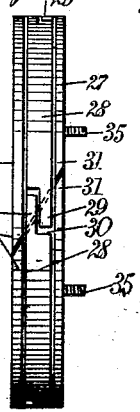
WITNESSES
S. Newman
W. Harrison
INVENTOR
Frederick L. McGahan
BY
ATTORNEYS

UNITED STATES PATENT OFFICE.

FREDERICK LUTHER McGAHAN, OF ST. LOUIS, MISSOURI.

HIGH-PRESSURE-PIPE HINGE.

1,056,762.

Specification of Letters Patent.

Patented Mar. 18, 1913.

Continuation of application Serial No. 329,525, filed August 7, 1906. This application filed November 3, 1911. Serial No. 658,338.

*To all whom it may concern:*

Be it known that I, FREDERICK L. MCGAHAN, a citizen of the United States, and a resident of St. Louis, in the State of Missouri, have invented a new and Improved High-Pressure-Pipe Hinge, of which the following is a full, clear, and exact description.

My invention relates to pipe hinges of the kind employed for connecting together two pipe sections or tubular members adapted for conveying gases and other fluids at high tension, for instance, up to 800 or 1000 pounds per square inch.

I seek, among other things, to provide a type of swivel union in which the two pipe sections, flexibly connected together, may have a maximum freedom of motion and a minimum degree of leakage when subjected to high fluid pressure.

Reference is to be had to the accompanying drawings forming a part of this specification, in which similar characters of reference indicate corresponding parts in all the figures.

Figure 1 is a central vertical section through my improved pipe hinge, showing the relative arrangement of the pipe sections, the coupling section, the various rings and packings, and the adjustments for the packings; Fig. 2 is a central vertical section upon the line 2—2 in Fig. 1, looking in the direction of the arrow, and showing particularly the sectors 14, together forming a packing ring, and also showing the screws 13 for adjusting the sectors; Fig. 3 is a vertical central section upon the line 3—3 in Fig. 1, looking in the direction of the arrow, this view having parts partially broken away and showing a split packing ring 27 provided with sectors 28, the sectors together forming a composite packing; Fig. 4 is an enlarged fragmentary section upon the line 4—4 in Fig. 3, showing one of the threaded stems 35 used for adjusting the sectors 28 relatively to the inner surface of the sleeve 19 encircling the same; Fig. 5 is a fragmentary section of the packing ring 27, defined by the line 5—5 in Fig. 3, showing the location therein of the sectors 28, and together forming an annular packing, each sector being provided with a continuous bevel surface 33 to enable these sectors to be adjusted; Fig. 6 is a fragmentary side elevation, partly broken away, and showing one of the threaded stems 35, together with the parts carried by it; Fig. 7 is an elevation of the packing ring 27 fitted with packing sectors 28, the latter forming together a composite packing of general annular form.

The pipe sections to be coupled are shown at 7, 8, the section 8 being provided with an enlarged end portion 8ª threaded internally as indicated in Fig. 1. These sections 7, 8 are also threaded internally at 9, 10, for the purpose of enabling them to be screwed upon other pipe sections or tubular members. A cap 11, threaded internally, is provided with apertures 12, spaced equidistant, as indicated in Fig. 2. Passing through portions of the cap 11 and located centrally within the apertures 12 are adjusting screws 13 converging toward the center of the cap. A number of sectors 14 of arcuate form are provided with lapping end 15 and with indentations 16. The screws 13 pass into the indentations 16 and are adapted to force the middle portions of the respective sectors toward the center of the pipe section 7. Each sector 14 is made of resilient material, preferably spring metal, and normally bows outward a little so as to be corrected by the pressure of the screw 13. In this manner the sectors 14 may be gently forced into such engagement with the exterior of the section 7 as to fit the same practically gastight. A coupling section 17 is provided with annular flanges 18, 19, and also provided with a flange 20, the latter extending inwardly. The flanges 18, 19 are threaded externally, and fitting upon the flange 18 is the cap 11 threaded internally for this purpose. Fitting upon the flange 19 is the enlarged portion 8ª of the pipe section 8, this enlarged portion being likewise threaded internally. A ring 21 is lodged against the flange 20, which thus constitutes a sort of shoulder for the coupling section 17. An annular sleeve 22 engages the ring 21 and is provided with an annular flange 23 projecting outwardly. A ring 24 fits against the annular flange 23 and is engaged directly by the central portion of the cap 11, this cap being secured firmly upon the coupling section 18, is not loosened by movements of the screws 13, except in so far as these screws may control the sectors 14 considered as parts of a composite packing.

The inner end of the pipe section 7 is provided with a bevel head 25 of annular form, and is further provided with a neck 26. Encircling this neck is a packing ring 27, having substantially the form of an annular trough, and fitting neatly within it are a number of sectors 28, of spring metal, together constituting a composite packing ring. Each sector 28 is provided with lapping ends 29, each sector forming a slip joint 30 with the adjacent end of the next sector. The ring 27 is split diagonally, being thus provided with bevels 31 mating each other. The ring 27, aside from the action of the sectors 28, acts a good deal like an ordinary packing ring, but the sectors 28 serve to render the ring more nearly airtight or gastight than would otherwise be the case. These sectors 28 have such curvature as corresponds exactly with the curvature of the inner surface of the sleeve 19. The annular groove in the ring 27 is shown at 32 in Fig. 5. Each sector 28 is provided internally with a continuous beveled edge 33. The ring 27 has apertures 34, the centers of which register with the threaded stems 35. Mounted revolubly upon each threaded stem 35 is a cam nut 36, threaded internally and fitting neatly but not tightly into one of the apertures 34. Each threaded stem 35 is further provided with a lock nut 37, also revolubly mounted thereupon. The cam nut 36 is provided with a frusto-conical portion 38, the several portions 38 fitting against the edges 33 of the sectors 28. The middle portion of the cam nut 36 is cylindrical, and is adapted to engage directly the bottom of the groove 32, as will be understood from Fig. 4. This arrangement enables the cam nuts 36 to exert great lateral pressure radially outward against the inner or bevel surfaces 33 of the sectors 28. The cam nuts 36 being adjusted to any desired pressure, the lock nuts 37 are tightened and the screws 35 are unable to work loose.

My device is assembled as follows: First the annular cap 11 is slipped over a part of the pipe section 7 and brought to the left of the position indicated in Fig. 1. The ring 24, the sleeve 22 and the ring 21 are next slipped onto the pipe section. Next the coupling section 17 is slipped on, but as the cap 11 is considerably to the left of the position indicated in Fig. 1, the annular head 25 projects a little to the right of the extreme right-hand portion of the flange 19. The ring 21 is next fitted with the sector 28 and the screws 35, the latter, however, being turned so as to leave the sectors 28 a little loose. The ring 27 and its accompanying parts are next forced over the beveled annular head 25 and caused to snap into place around the neck 26. The coupling section 17 is next moved up against the ring 27, or, in other words, moved to the right according to the view shown in Fig. 1, and the ring 27, the sleeve 22, the ring 24, and the cap 11 are all moved to the right, the cap 11 being turned so as to force it closely to the right relatively to the coupling section 17, thus tightening the rings 21, 24 and the sleeve 22 firmly in position. The screws 13 and the cam nuts 36 are now adjusted so as to render the device gastight without destroying the freedom of movement between the coupling section 17 and the pipe section 7. Lastly, the pipe section 8 is screwed firmly in position upon the coupling section 17 as indicated in Fig. 1. The swivel union is now complete and ready for use.

Either of the pipe sections 7, 8 may be turned angularly with reference to each other upon an axis which coincides with the geometrical axis of the coupling section 17. By adjusting the sectors 14 and 28 by means of the screws 13 and cam nuts 36, wear may be compensated from time to time, expansion and contraction due to varying temperatures may be compensated, and all irregularity in the fitting of the parts may be virtually remedied.

Having thus described my invention, I claim as new and desire to secure by Letters Patent:

1. The combination of a pipe section, a coupling section encircling said pipe section and swiveled relatively thereto, a packing ring disposed intermediate of said coupling section and said pipe section, a packing mounted within said packing ring, and means controllable at will for adjusting the general diameter of said packing relatively to said coupling section.

2. The combination of a pipe section, a member encircling the same and swiveled relatively thereto, said member being provided with an annular groove, a plurality of spring sectors having overlapping ends and mounted within said groove and together forming a composite packing ring, and screws mounted within said member and respectively engaging said sectors for the purpose of adjusting the same relatively to said pipe section.

3. A device of the character described, comprising a pipe section, an annular member swiveled relatively thereto, a packing ring disposed intermediate of said pipe section and said annular member, said packing ring being provided with a groove, a plurality of sectors provided with overlapping ends and disposed within said groove so as to constitute together a composite packing ring, and a plurality of separate members mounted within said packing ring and movable relatively thereto for adjusting the pressure exerted by said sectors.

4. The combination of a pipe section provided with a neck, a spring packing ring of metal encircling said neck, an annular member encircling said spring packing ring, a packing mounted within said spring packing ring and engaging said annular member, and means controllable at will for adjusting the general diameter of said packing ring.

5. The combination of a pipe section provided with a neck, a ring encircling said neck and provided with a groove, a plurality of sectors provided with overlapping ends and mounted within said groove so as to form a composite packing of annular form, screw mechanism mounted within said ring and movable relatively thereto for adjusting said sectors relatively to said ring, and an annular member encircling said pipe section and swiveled relatively thereto, said annular member being engaged directly by said sectors.

6. The combination of a pipe section, a coupling section connected therewith, a packing ring disposed within said coupling section, a packing within said packing ring, a pipe section inserted partially within said a coupling section and engaging said packing ring, and means controllable at will for adjusting said packing relatively to said coupling section.

7. The combination of a pipe section, a coupling section connected therewith, a packing ring disposed adjacent to said coupling section and provided with a movable packing, means controllable at will for adjusting said packing relatively to said packing ring, and a second pipe section connected with said packing ring.

8. In a pipe hinge, the combination of a pipe section, a coupling section connected therewith, a packing ring mounted within said coupling section, a packing mounted within said packing ring, means controllable at will for adjusting said packing relatively to said packing ring, and a pipe section extending through said packing ring and provided with a surface for engaging the same directly.

9. In a pipe hinge, the combination of a coupling section, a cap mounted thereupon and provided with an annular groove, a packing mounted within said groove and made up of separate sections having overlapping ends, separate screws for adjusting said sections at will, and a pipe section extending through said cap and engaged by said sections.

10. In a pipe hinge, the combination of a coupling section, a pipe section, a packing ring disposed intermediate of said coupling section and said pipe section, said packing ring being provided with a groove, pins mounted upon said packing ring and extending through the same, conical members revoluble relatively to said pins, and a packing mounted within said packing ring and engaging said coupling section.

11. In a pipe hinge, the combination of two pipe sections, a coupling connecting the pipe sections, a ring having an annular exterior groove and surrounding one pipe section and engaging a member of the coupling, said ring having lateral openings, a plurality of sectors having overlapping ends and arranged within the groove of the ring, the sectors having internal beveled surfaces, stems secured to the ring and projecting through the apertures thereof, and cams adjustably mounted on the said stems.

12. In a pipe hinge, the combination of two pipe sections, one having an annular exterior groove near its end, a coupling connecting the sections, a split ring having an exterior annular groove and fitting in the groove of the pipe section, said ring having lateral openings in one side, a plurality of sectors having overlapping ends and arranged in the groove of the ring, said sectors having internal beveled surfaces, threaded stems secured to the ring and projecting into the apertures thereof, and cam nuts on the said stems.

In testimony whereof I have signed my name to this specification in the presence of two subscribing witnesses.

FREDERICK LUTHER McGAHAN.

Witnesses:
D. P. HATCH,
LIZZIE D. BRETT.